United States Patent [19]

Damron

[11] Patent Number: 5,408,818

[45] Date of Patent: Apr. 25, 1995

[54] MAGNETIC BAR ADAPTER FOR RAKES

[76] Inventor: Matthew S. Damron, 533 S. Bayside, Detroit, Mich. 48217

[21] Appl. No.: 78,895

[22] Filed: Jun. 21, 1993

[51] Int. Cl.$^6$ ............................................. A01D 7/00
[52] U.S. Cl. ............................... 56/400.04; 56/400.07
[58] Field of Search .................... 56/400.04, 400.07, 1, 56/400.01; 7/901

[56] References Cited

U.S. PATENT DOCUMENTS 2,663,987  12/1953  Biener ............................. 56/400.04
4,189,908   2/1980  Brock, Jr. .................... 56/400.01 X

FOREIGN PATENT DOCUMENTS 253207  10/1962  Australia ....................... 56/400.01

Primary Examiner—Terry Lee Melius

[57] ABSTRACT

Disclosed is a magnetic bar which is attached to the tines of leaf rakes for a purpose of retrieving nails from landscaping surrounding construction jobs. As most magnetic devices only collect nails which are loosely scattered above the soil, and that are in unobstructed areas, the disclosed invention is needed to collect those nails which are semi-embedded in the soil and that lay in bushes and in other tight places. The bar is situated along the tines of the rake and, as the rake is used to clean up a job site, the tines free any nails and draw them to the magnetic bar. By having the tines of the rake draw the nails to or near the bar, the size of the bar itself can be reduced as a large amount of magnetic pull is no longer needed. This reduction in size will result in a lower cost of the tool. The magnetic bar also strengthens the tines by becoming a cross-brace. This will translate into fewer strokes of the rake to gather debris.

3 Claims, 2 Drawing Sheets

MAGNETIC BAR ADAPTER FOR RAKES

TECHNICAL FIELD

This invention relates to devices which are used to retrieve nails and other unwanted metal objects from yards, lawns, and other areas where injury can occur.

BACKGROUND OF THE INVENTION

In the construction trades there are many situations where nails end up on the ground for one reason or another. These nails left as is become a hazard if stepped on. The most prolific construction situation where nails are a big problem is in residential roofing. In most cases where the home has two roofs already, it is necessary to strip off the old roofing and start anew. As the old roof is stripped down to the roof boards, hundreds of roofing nails are freed up which cascade down and off the roof. It is very hard indeed to contain these loose nails. Therefore, the nails, and the shingle debris, usually end up on the lawn. This scrap is then picked up by hand and walked across the lawn and loaded into a truck. This is done around the perimeter of the home.

As the shingle scrap is usually large and heavy in nature, it can be removed without too much difficulty. However, finding the loose nails in the grass or bushes is hard to do as they can become embedded in the soil from the large amount of foot traffic loading the shingle scraps. As stated above, overlooked nails can cause injury if stepped on, and cause flat tires if driven on. Preventing injury is important as many children play in yards. It also happens that lawn mowers hit these nails and shoot them like bullets causing injury and damage.

There are magnetic devices which are designed to gather nails from the lawn after the shingle debris is removed. These devices consist of an elongated magnetic bar having a wheel situated at each end and a handle centrally attached to the magnetic bar. The wheels, being rigidly attached to the bar, keep the bar at a constant height off the ground. The magnetic field picks up nails which are then discarded. The elongated portion usually ranges in length from two to four feet. Because these devices skim the surface, they are more commonly referred to as magnetic sweepers, and can range in price from $125.00 to $350.00.

Another device which indirectly aids in collecting nails is the common multi-tined leaf rake. In grass and soil areas, the leaf rake is usually employed to gather up the smaller pieces of scrap after the heavy debris is loaded onto a truck. The rake can collect some of the nails but many slip through the large gaps in the tines. These tines are also flexible and allow the heavier scraps to remain in place on the lawn. Only after repeated strokes of the rake does the debris form a collectible pile. These repeated strokes often cause damage to the lawn by tearing the blades of grass with the tines.

The clean-up phase of a roofing job is one of the most important. A good job can get referrals and recommendations, and a bad job can cost you money, time, and open you up to insurance claims.

The above problems have necessitated a new and useful invention that uses components of both the magnetic sweeper, and the leaf rake to form a tool which does far more for much less. A main objective of the present invention is to provide a means for removing nails from the ground at the same time the clean-up is taking place. This is done by placing a magnetic bar along the lower span of tines on the leaf rake, and rigidly attaching same. Spaced at intervals along the "rake-side" of the bar are threaded studs which are inserted through the tines. A backing plate is then placed over the studs and wing nuts are tightened down.

Another objective of the present invention is to provide a means for removing the nails from the ground which have been embedded due to foot traffic. Magnetic sweepers tend to miss these nails because they lack the magnetic pull needed to loosen the object from the soil. At any time after the clean-up is finished, the embedded nails can resurface and pose a potential hazard.

Still another objective of the present invention is to provide a means for removing the nails from around bushes, near the walls of the structure, and from areas too tight for a magnetic sweeper.

A further objective of the present invention is to provide a tool which costs far less than a magnetic sweeper. It is foreseen that the present invention costs one-third of what a low-cost sweeper does.

SUMMARY OF THE INVENTION

In light of the above-stated problems with existing magnetic tools and the inadequacies of leaf rakes used to clean up roofing jobs, the present invention combines the two to form a new and useful device that not only collects nails which are embedded in the soil, the magnetic bar itself becomes a cross-brace which strengthens the tines resulting in less strokes over the grass to collect the same amount of scrap. The magnetic bar will fit any rake having a plurality of tines.

In accordance with a preferred embodiment of the present invention, disclosed is a series of ceramic magnets which are placed inside a stainless steel house. Two threaded studs are then welded to the non-working back surface of the magnetic bar. The studs are set at predetermined points in order to receive a backing plate. Using wing nuts, the backing plate is tightened down against the tines of the rake. The rake then becomes sandwiched between the magnetic bar and the backing plate. As the clean-up process of the roofing job begins, the heavier debris is loaded onto a truck revealing the smaller pieces of debris and the nails. As the rake is used to collect the smaller pieces, the tines act to loosen nails from the soil while the magnetic field of the bar draws the freed nail to its working surface. Once a certain amount of nails are collected to the working surface, the user removes them with a swiping motion. The universal design of the magnetic bar allows the user to employ any multi-tined leaf rake. As the magnet itself is of the permanent type, the magnet can be removed from a dysfunctional rake and installed on a new one.

By having the rake loosen the nails, the magnet does not therefore need to be as big or powerful. This savings in size and strength can be translated into a savings of money which is passed on to the consumer. The smaller size of the magnet also lets the user recover nails from areas not before accessible to magnetic sweepers, such as around bushes and the like.

These and other features, advantages, and objects of the present invention will become more readily understood by studying the following detailed description of the embodiment in conjunction with the attached drawings and claims.

BRIEF DESCRIPTION OF THE DRAWINGS

In the drawings where like reference numerals are used to indicate identical components in the various figures:

FIG. 3 is a perspective view of a magnetic bar of the present invention as it is mounted on an "A" style leaf rake.

DETAILED DESCRIPTION OF THE EMBODIMENTS

Figure 1:
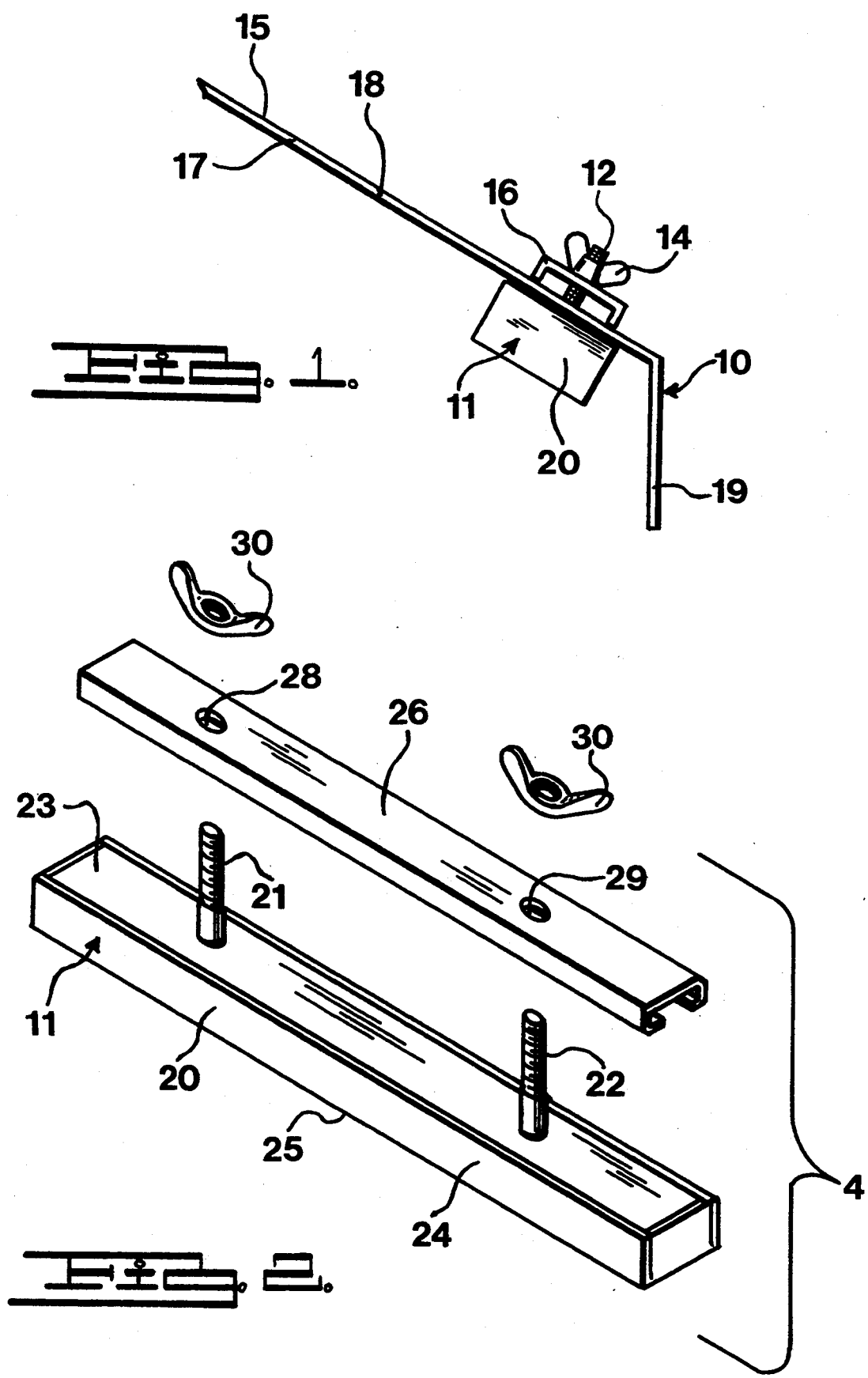
FIG. 1 is a cross-sectional view of the magnetic bar as it is mounted to a typical leaf type rake.

Referring now to the drawings, Figure I shows a side view of the magnetic bar assembly 11 comprising a bar portion 20 which has a threaded stud 12 rigidly attached thereon for the purpose of receiving a backing plate 16 and a wing nut 14. The magnetic bar 20 is placed against the inside surface 17 of the rake tines 18 which are extended from the rake assembly 10. The stud 12 is then fitted with the backing plate 16 which interfaces the outside surface 15 of the rake tines 18 and is rigidly held by tightening a wing nut 14. The magnetic bar assembly 11 will now collect nails which are sprung loose by the tine ends 19. The magnetic bar assembly 11 can be situated at other areas located along the rake tines 18 by loosening the wing nut 14 and retightening it after the desired location is achieved.

Figure 2:
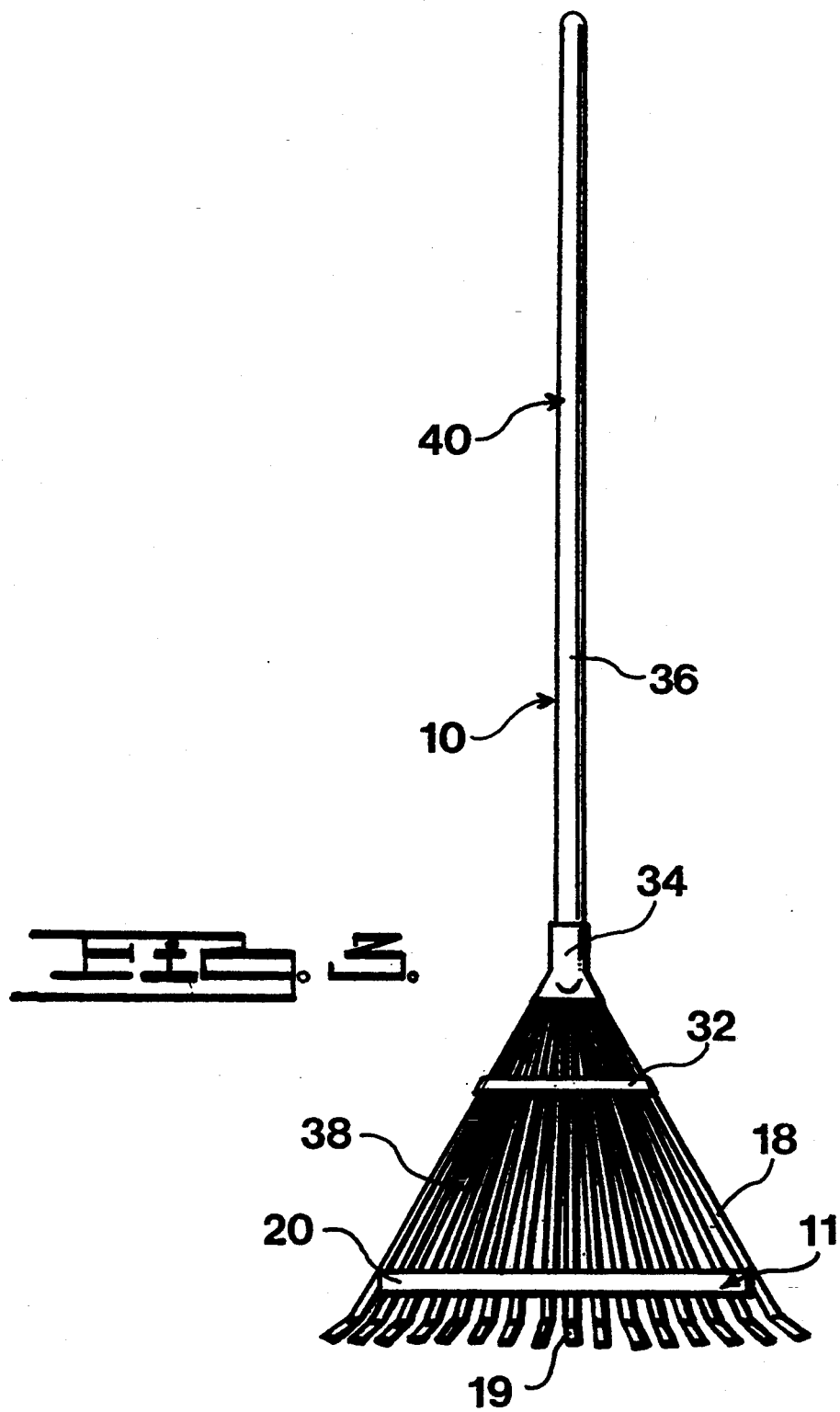
FIG. 2 is an exploded view of the various components which make up a preferred embodiment of the present invention.

FIG. 2 shows an exploded perspective view of the magnetic bar assembly 11 embraced by bracket 4. Shown is the magnetic bar 20 having a first threaded stud 22 and a second threaded stud 21 rigidly attached to plate 23. Surrounding the stud plate 23 is a stainless steel housing 24 which polarizes the internal series of ceramic magnets (not viewed) to pull from the front, or working surface 25. A backing plate 26, having a first stud access aperture 29 and a second stud access aperture 28, is placed over studs 22 and 21 and tightened down with wing nuts 30 (two).

FIG. 3 shows a frontal view of the rake assembly 10 mated with a magnetic bar assembly 11. The magnetic bar 20 is attached to the inside surface 38 of the rake tines 18 and can be situated anywhere between the tine cross-brace 32 and the tine ends 19. By combining the rake assembly 10 and the magnet assembly 11, a new device 40 is created. To operate the combined assembly 40, the user manipulates the handle 36. The plurality of tines 18 are tightly bound together and rigidly attached to the handle 36 by a collar 34.

While the foregoing embodiments of the present invention are well defined and suited to achieve the objects stated above, those skilled in the art should realize that such embodiments are subject to modification, alteration, and change without departing from the spirit of the present invention. For example, small wheels could be attached to either side of the magnetic bar and a handle connected to the backing plate. A short set of tines, meant to manipulate the nails free from the landscape, could extend from the front of the bar and be held in between the backing plate and the bar by tightening down the wing nuts.

As another example, the tines of the rake itself could be magnetized to collect nails. This method, however, would make nail removal difficult. In still another example, the magnetic bar could be an electric magnet having a cord run inside the handle. When plugged in, the magnet would collect nails. This method is subject to a power source, and may be difficult to operate as you would be constructively tied to a tether (power cord).

Other variations will no doubt occur to those skilled in the art upon the study of the text and drawings contained herein. Accordingly, it is to be understood that the present invention is not limited to the specific embodiments described and depicted herein, but should be deemed to extend to the subject matter defined by the appended claims, including all fair equivalents thereof.

I claim:

1. An elongated magnetic bar adapted to be mounted on a multiple tined leaf rake, said magnetic bar comprising;
    a magnetic bar member having a metallic shell;
    at least 1 threaded stud extending outwardly from the non-working rear face of said bar;
    a backing support plate having at least 1 aperture located centrally along the long axis of said plate, said at least 1 aperture being adapted to receive said at least 1 threaded stud;
    a tightening means cooperable with said at least 1 threaded stud for drawing said plate toward the rear face of said bar, the tines of said rake being between the plate and the bar providing a support to rigidly maintain said magnetic bar and said plate at a fixable cross position for the collection of ferrous materials from a landscape.

2. The magnetic bar adapter of claim 1 wherein said bar is from 10 to 24 inches in length.

3. The magnetic bar adapter of claim 1 wherein said magnetic bar and said backing plate are adapted to be rigidly attachable to any multiple tined rake.

* * * * *